(12) United States Patent
Durden et al.

(10) Patent No.: US 12,527,321 B2
(45) Date of Patent: Jan. 20, 2026

(54) GERMICIDAL COMPOSITIONS FOR IMPROVED BIOCIDE RECOVERY AND EFFICACY

(71) Applicant: Edgewell Personal Care Brands, LLC, Chesterfield, MO (US)

(72) Inventors: Catherine Durden, Midland Park, NJ (US); Kamil Wojtowicz, Congers, NY (US); Tao Zheng, New City, NY (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 943 days.

(21) Appl. No.: 17/761,231

(22) PCT Filed: Sep. 25, 2020

(86) PCT No.: PCT/US2020/052684
§ 371 (c)(1),
(2) Date: Mar. 17, 2022

(87) PCT Pub. No.: WO2021/062131
PCT Pub. Date: Apr. 1, 2021

(65) Prior Publication Data
US 2022/0361491 A1    Nov. 17, 2022

Related U.S. Application Data

(60) Provisional application No. 62/906,900, filed on Sep. 27, 2019.

(51) Int. Cl.
*A01N 33/12* (2006.01)
*A01N 25/34* (2006.01)
*A01P 1/00* (2006.01)

(52) U.S. Cl.
CPC ............. *A01N 33/12* (2013.01); *A01N 25/34* (2013.01); *A01P 1/00* (2021.08)

(58) Field of Classification Search
CPC ...................................................... A01N 33/12
See application file for complete search history.

(56) References Cited

U.S. PATENT DOCUMENTS

| 2010/0278906 A1 | 11/2010 | Sondgeroth et al. |
| 2017/0055523 A1 | 3/2017 | Malchesky et al. |
| 2018/0084777 A1 | 3/2018 | Jiang |

FOREIGN PATENT DOCUMENTS

| GB | 2475790 A | 6/2011 | |
| WO | WO-0248296 A2 * | 6/2002 | ............... C11D 1/62 |

OTHER PUBLICATIONS

Doug J Hinchliffe et al, "The adsorption of alkyl-dimethyl-benzyl-ammonium chloride onto cotton nonwoven hydroentangled substrates at the solid-liquid interface is minimized by additive chemistries", Textile Research Journal, vol. 87, No. 1, Jul. 22, 2016 (Jul. 22, 2016), p. 70-80.
PCT/US2020/052684 Search Report and Written Opinion dated Jan. 25, 2021.

* cited by examiner

*Primary Examiner* — Svetlana M Ivanova
(74) *Attorney, Agent, or Firm* — Edgar Rodriguez

(57) ABSTRACT

A germicidal composition includes a biocide selected from a benzyl substituted quaternary ammonium compound (QAC) and a release agent selected from a non-benzyl substituted quaternary ammonium cationic surfactant. The release agent may further optionally include an amine amphoteric surfactant. A sterilization product may include a substrate and at least a biocide of a germicidal composition impregnating the substrate, although one or more other components of the germicidal composition may be attached thereto or otherwise be impregnating the substrate. A method may include contacting a substrate with a germicidal composition, and/or modulating one or more of a biocide and a release agent to make a germicidal composition, a sterilization product, or any combinations thereof.

19 Claims, 2 Drawing Sheets

GERMICIDAL COMPOSITIONS FOR IMPROVED BIOCIDE RECOVERY AND EFFICACY

CROSS-REFERENCE TO RELATED APPLICATIONS

This application is the National Phase of International Application No. PCT/US2020/52684, filed on Sep. 25, 2020, claiming priority to U.S. Provisional Patent Application No. 62/906,900, filed on Sep. 27, 2019, the content of which is incorporated herein for reference in its entirety.

TECHNICAL FIELD

Embodiments relate to germicidal compositions including a biocide and a release agent for improved biocide recovery in expressed fluid from a substrate and consequently improved efficacy of the biocide for sterilization.

BACKGROUND

Biocides, such as cationic antimicrobial biocides, have been incorporated into compositions for the sterilization of a variety of surfaces. For example, a quaternary ammonium compound and a biguanide or a bisbiguanide may be used to sterilize surfaces. Meanwhile, a quaternary ammonium compound and a polyvinyl alcohol or a poloxamer may be used with wipes (e.g., cellulosic-based fibrous webs) to sterilize surfaces. Such compositions, however, may be ineffective to inhibit the absorption in wipes of specific biocides or may increase cost and complexity of sterilization technology. Wipes may also be coated with a crosslinked releasing agent that forms a structural network which physically adheres to the wipe together with a permeabilizer that accounts for a blocking effect of leached crosslinked releasing agents. While such compositions may inhibit the absorption of certain biocides in wipes, pre-treatment with a crosslinked releasing agent and a permeabilizer may increase cost and complexity. Thus, there is considerable room for improvement to provide less costly or less complex but effective sterilization technologies.

SUMMARY

Embodiments relate to germicidal compositions including a biocide and a release agent. For example, a germicidal composition comprises (i) a biocide selected from a benzyl substituted quaternary ammonium compound (QAC) and (ii) a release agent selected from a non-benzyl substituted QAC. The release agent may further include an amine amphoteric surfactant. Notably, recovery of a biocide in expressed fluid from a fibrous substrate may be modulated as the concentration of release agent in a germicidal composition changes. Thus, one might finely tailor an amount of biocide being delivered using a release agent to maximize biocide efficacy while minimizing cost and/or complexity of sterilization technology.

The ratio of a release agent to a biocide may be about 0.5:1 to about 3:1. Additionally or alternatively, a biocide may be present in an amount of about 0.01 wt. % to about 0.5 wt. %, based on the total weight of a germicidal composition. Additionally or alternatively, a release agent may be present in an amount of about 0.1 wt. % to about 1.0 wt. %, based on the total weight of a germicidal composition. For example, a release agent may be present in an amount of about 0.2 wt. % to about 0.6 wt. %, based on the total weight of a germicidal composition, and a biocide may be present in an amount of about 0.1 wt. % to about 0.4 wt. %, based on the total weight of the germicidal composition.

In any of the preceding embodiments, a benzyl substituted QAC may be selected from alkyl dimethyl benzyl ammonium chloride (ADBAC), diisobutylphenoxyethyoxyethyl dimethyl benzyl ammonium chloride, alone or any combination thereof. For example, a germicidal composition may include $C_8$-$C_{18}$ ADBAC alone, diisobutylphenoxyethyoxyethyl dimethyl benzyl ammonium chloride alone, or any combination thereof.

In any of the preceding embodiments, a non-benzyl substituted QAC may be selected from a non-benzyl substituted quaternary ammonium cationic surfactant, a non-benzyl substituted quaternary ammonium cationic silicone, a non-benzyl substituted quaternary ammonium cationic phospholipid, alone or any combination thereof. For example, a germicidal composition may include a non-benzyl substituted quaternary ammonium halide cationic surfactant, such as e.g., Dihydroxypropyl Polyethylene Glycol (PEG)-5 Linoleammonium Chloride, alone or in combination with one or more other non-benzyl substituted QACs. The release agent may also include an amine amphoteric surfactant. For example, Disodium Cocoamphodiacetate may be present in a mixture with a non-benzyl substituted quaternary ammonium cationic phospholipid.

In any of the preceding embodiments, a germicidal composition may include other ingredients such as a solvent, a preservative, a preservative booster, an emollient, a pH adjuster, a fragrance, a chelating agent, a foaming agent, an extract, alone or any combination thereof. The other ingredients may be present in an amount of about 98.5 wt. % to about 99.9 wt. %, based on the total weight of a germicidal composition.

Embodiments further relate to a wipe comprising (i) a fibrous substrate and (ii) a germicidal composition impregnating the fibrous substrate. For example, a wipe may include a germicidal composition comprising (i) a biocide selected from a benzyl substituted QAC and (ii) a release agent selected from a non-benzyl substituted QAC. Additionally or alternatively, at least an initial ratio of a release agent to a biocide may be about 0.5:1 to about 3:1. For example, a ratio of a release agent to a biocide when a germicidal composition (e.g., a bulk solution) first contacts a fibrous substrate (e.g., a wipe) may be about 0.5:1 to about 3:1.

Embodiments further relate to methods of making germicidal compositions, sterilization products, or any combination thereof. For example, a method of making a germicidal composition may include mixing (i) a biocide and (ii) a release agent. Additionally or alternatively, a method of making a sterilization product (e.g., a wipe) may include combining (i) a substrate (e.g., a fibrous substrate) and (ii) a germicidal composition. For example, a method of making a wipe may include applying a germicidal composition, having a ratio of release agent to biocide of about 0.5:1 to about 3:1, onto a fibrous substrate. The germicidal composition and the fibrous substrate may be packaged in a same container.

Embodiments further relate to methods of modulating the recovery of a biocide in expressed fluid from a sterilization product by (i) maintaining the amount of one of a biocide or a release agent substantially constant and varying the amount of the other of the biocide or the release agent or (ii) modulating the amount of the biocide and the release agent at the same time. For example, a method of modulating the recovery of Benzalkonium Chloride in expressed fluid from wipes may include varying the amount of a release agent in the germicidal composition that is applied to wipes at constant levels of Benzalkonium Chloride.

Embodiments further relate to methods of using germicidal compositions, sterilization products, alone or any combination thereof. For example, a surface (e.g., skin) may be sterilized by contacting the surface with a wipe having a germicidal composition of any of the preceding embodiments.

BRIEF DESCRIPTION OF THE DRAWINGS

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION

Figure 1:
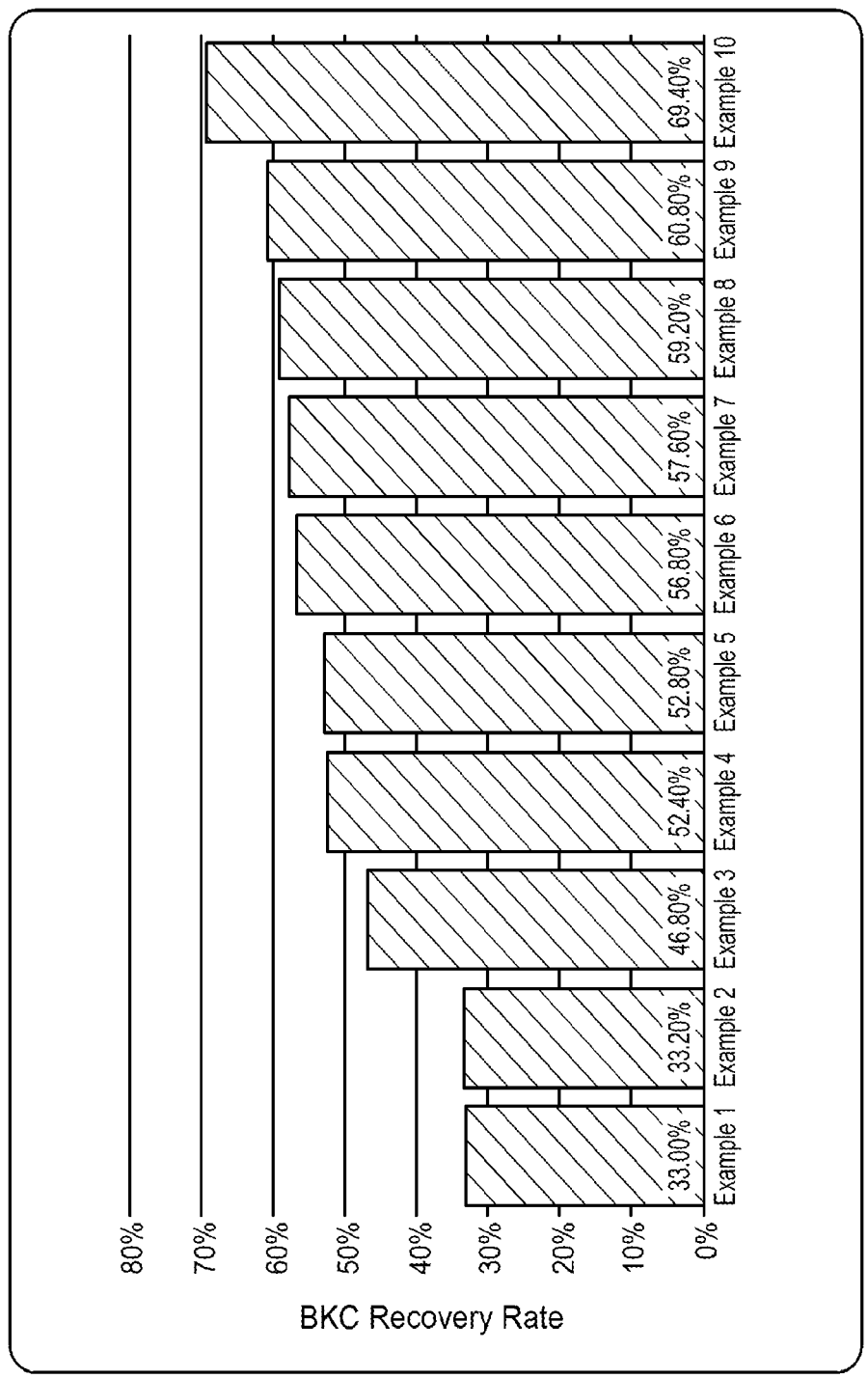
FIG. 1 is a graph showing the effect of various release agents on the recovery of Benzalkonium Chloride in expressed fluid from a wipe according to embodiments.

Embodiments can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated. Where appropriate, the International Nomenclature of Cosmetic Ingredients (INCI) name of ingredients/components is provided. Any numerical range recited herein is intended to include all sub-ranges subsumed therein, and such ranges are understood to include each and every number and/or fraction between the stated range lower and upper values.

Amine Compounds

Amine compounds are characterized as primary (1°), secondary (2°), tertiary (3°) or quaternary (4°) based on how many group substituents (e.g., alkyl substituents) are attached to the nitrogen atom. Additionally, a quaternary ammonium compound (QAC) is characterized with the general formula $R_4N^+$ in the cationic form and with the general formula $R_4N^+X^-$ in the salt form where ($R_4$) refers to the four group substituents of the nitrogen atom and ($X^-$) refers to the counterion. The substituents may independently be, for example, substituted, unsubstituted, straight chain, branched chain, interrupted, and/or uninterrupted alkyl, aryl, alkylaryl, arylalkyl, cycloalkyl (aromatic or non-aromatic), heterocyclyl, and/or alkenyl groups. Moreover, two or more of the substituents $R_4$ may together with the nitrogen atom form a substituted or unsubstituted heterocyclic ring. Interrupting groups may include heteroatoms such as oxygen, nitrogen, sulphur, and phosphorus-containing groups (e.g. phosphinate). The most common counterion is chloride although other halides (e.g., fluoride, bromide, iodide, etc.) and non-halide ions (e.g., sulphonate, saccharine, etc.) may be used.

Biocide

Preferably the biocide is a QAC having sufficient germicidal potency to kill a microorganism such as, for example, a virus, bacteria, yeast, and the like. The biocide may, for example, be applied to a surface to disinfect or sterilize the surface. For example, the biocide may be applied to disinfect or sterilize skin, an implement (e.g., a medical tool, etc.), a floor, a wall, a table, an inanimate object (e.g. medical glove, dwelling surface, automobile surface, furniture surface, etc.), or any other surface in need of sterilization.

Preferably the biocide is selected from a benzyl substituted QAC, and more preferably is selected from a dimethyl benzyl substituted QAC. In this regard, at least one of the four group substituents of the quaternary ammonium cation is a benzyl group and preferably at least two of the four group substituents of the quaternary ammonium cation are methyl groups. A dimethyl benzyl substituted QAC may be characterized by the following structure:

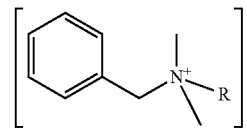

where R is any substituted, unsubstituted, straight chain, branched chain, interrupted, and/or uninterrupted group. In addition, the benzyl group is substituted or unsubstituted. The dimethyl benzyl substituted QAC may include a mixture of QACs such as, for example, one or more of the following: alkyl dimethyl benzyl ammonium chloride (ADBAC or Benzalkonium Chloride) including $C_{12}$ (5%) $C_{14}$ (60%) $C_{16}$ (30%) Cis (5%), $C_{12}$ (40%) $C_{14}$ (50%) $C_{16}$ (10%), $C_{12}$ (50%) $C_{14}$ (30%) $C_{16}$ (17%) $C_{18}$ (3%), $C_{12}$ (1%) $C_{14}$ (98%) $C_{16}$ (1%), $C_{12}$ (5%) $C_{14}$ (60%) $C_{16}$ (30%) $C_{18}$ (5%), $C_{12}$ (25%) $C_{14}$ (60%) $C_{16}$ (15%), $C_{8-10}$ (2.5%) $C_{14}$ (61%) $C_{16}$ (23%) $C_{18}$ (2.5%), $C_{12}$ (14%) $C_{14}$ (58%) $C_{16}$ (28%), $C_{12}$ (65%) $C_{14}$ (25%) $C_{16}$ (10%), $C_{12}$ (67%) $C_{14}$ (25%) $C_{16}$ (7%) $C_{18}$ (1%), $C_{12}$ (61%) $C_{14}$ (23%) $C_{16}$ (11%) Cis (5%), $C_{12}$ (3%) $C_{14}$ (95%) $C_{16}$ (2%), $C_{12}$ (70%) $C_{14}$ (30%), $C_{12}$ (5%) $C_{14}$ (90%) $C_{16}$ (5%); ADBA Saccharinate including $C_{12}$ (40%) $C_{14}$ (50%) $C_{16}$ (10%); alkyl dimethyl ethylbenzyl ammonium chloride (ADEBAC) including $C_{12}$ (68%) $C_{14}$ (32%), $C_{12}$ (50%) $C_{14}$ (30%) $C_{16}$ (17%) Cis (3%); n-alkyl dimethyl 1-naphtylmethyl ammonium chloride including $C_{12}$ (98%) $C_{14}$ (2%); n-alkyl dimethyl dimethyl ammonium chloride including $C_{12}$ (68%) $C_{14}$ (32%); dodecyl benzyl trimethyl ammonium chloride; diisobutylphenoxyethyoxyethyl dimethyl benzyl ammonium chloride (Benzethonium Chloride); methyl dodecyl benzyl tri methyl ammonium chloride (80%) methyl dodecyl xylene bis tri methyl ammonium chloride (20%); and/or diisobutyl cresoxyethoxyethyl dimethyl benzyl ammonium chloride monohydrate.

Accordingly, the biocide may include an alkyl dimethyl benzyl ammonium halide such as $C_8$-$C_{18}$ ADBAC, a diisobutylphenoxyethyoxyethyl dimethyl benzyl ammonium halide such as diisobutylphenoxyethyoxyethyl dimethyl benzyl ammonium chloride, alone or any combination thereof. For example, the germicidal composition may include only one or more $C_8$-$C_{18}$ ADBACs, only diisobutylphenoxyethyoxyethyl dimethyl benzyl ammonium chloride, or a combination of one or more $C_8$-$C_{18}$ ADBACs as a first biocide and diisobutylphenoxyethyoxyethyl dimethyl benzyl ammonium chloride as a second biocide.

The biocide may be present in an amount of about 0.01 wt. % to about 0.5 wt. %, based on the total weight of the germicidal composition. The biocide may, for example, be present in an amount of 0.008 wt. %, 0.15 wt. %, 0.3 wt. %, 0.55 wt. %, 0.6 wt. %, including every number and/or fraction therebetween, based on the total weight of the germicidal composition. For example, the germicidal composition may include one or more $C_8$-$C_{18}$ ADBACs present in an amount of about 0.01 wt. % to about 0.5 wt. %, diisobutylphenoxyethyoxyethyl dimethyl benzyl ammonium chloride present in an amount of about 0.01 wt. % to about 0.5 wt. %, or a combination of one or more $C_8$-$C_{18}$ ADBACs as a first biocide and diisobutylphenoxyethyoxyethyl dimethyl benzyl ammonium chloride as a second biocide present in a total amount of about 0.01 wt. % to about 0.5 wt. %, based on the total weight of the germicidal composition.

Release Agent

Unexpectedly, recovery of a biocide in expressed fluid from a fibrous substrate can be modulated as the concentration of release agent in a germicidal composition changes. Indeed, observed recovery of a biocide as a function of increasing release agent is opposite to any conventional expectation given the changes to relative concentrations. Without being bound to any theory, a release agent may be selected which in effective amounts reduces the bonding of biocide to an anionic fibrous substrate by competing for electrostatic binding sites while synergistically allowing the biocide to impregnate more of the fibrous substrate and/or occupy less of the surface of the fibrous substrate. The release agent may also be uncrosslinked and/or may be present in a homogenous mixture with the biocide. In addition, the biocide may be selected to have a higher germicidal potency than the release agent (if any). The biocide may be selected which in effective amounts provides greater than a 2-log kill rate (a 99% reduction of 1,000,000 colony forming units (CFU) to 10,000 CFU) such as a 3-log kill rate (a 99.9% reduction of 1,000,000 CFU to 1,000 CFU), a 6-log kill rate (e.g., a 99.9999% reduction of 1,000,000 CFU to 1 CFU), etc. Thus, effectiveness of the biocide may be maximized while cost and/or complexity of the sterilization technology may be minimized.

The release agent may be selected from a non-benzyl substituted QAC. In this regard, no substituents $R_4$ of the quaternary ammonium cation are a benzyl group (i.e., no $C_6H_5CH_2$ group is covalently linked directly to the nitrogen atom) but may otherwise include any substituted, unsubstituted, straight chain, branched chain, interrupted, and/or uninterrupted group, including for example a substituent $R_4$ having a benzyl group that is spaced apart from the nitrogen atom. The non-benzyl substituted QAC may be selected from a non-benzyl substituted quaternary ammonium cationic surfactant, a non-benzyl substituted quaternary ammonium cationic silicone, a non-benzyl substituted quaternary ammonium cationic phospholipid, alone or any combination thereof.

Preferably, the non-benzyl substituted quaternary ammonium cationic surfactant, in its salt form, is selected from Dihydroxypropyl PEG-5 Linoleammonium Chloride, Behentrimonium Chloride, Centrimonium Chloride, Dicetyldimonium Chloride, Bishydroxyethyl Dihydroxypropyl Stearammonium Chloride, alone or any combination thereof. Preferably, the non-benzyl substituted quaternary ammonium cationic silicone is selected from a quaternary siloxane, a silicone quaternium, alone or any combination thereof. The quaternary siloxane may be selected from, for example, a quaternary alkyl siloxane such as Quaternary Polydimethylsiloxane (Silquat® Di-10, Siltech Corporation). The silicone quaternium may be selected from, for example, Silicone Quaternium-3, Silicone Quaternium-8, Silicone Quaternium-16, Silicone Quaternium-17, Silicone Quaternium-20, Silicone Quaternium-22, alone or any combination thereof. For example, the silicone quaternium may be Silicone Quaternium-20 and Propylene Glycol (SilPlex® J2-S-PG, Siltech Corporation).

Preferably, the non-benzyl substituted quaternary ammonium cationic phospholipid, in its salt form, is selected from Cocamidopropyl PG-Dimonium Chloride Phosphate, Linoleamidopropyl PG-Dimonium Chloride Phosphate, Sunflowerseedamidopropyl PG-Dimonium Chloride Phosphate, Sodium Olivamidopropyl PG-Dimonium Chloride Phosphate, Stearamidopropyl PG-Dimonium Chloride Phosphate, Sodium Ricinoleamidopropyl PG-Dimonium Chloride Phosphate, Dimer Dilinoleamidopropyl PG-Dimonium Chloride Phosphate, Sodium Borageamidopropyl PG-Dimonium Chloride Phosphate, Sodium Grapeseedamidopropyl PG-Dimonium Chloride Phosphate, Myrstamidoprpyl PG-Dimonium Chloride Phosphate, alone or any combination thereof. In addition to any of the foregoing non-benzyl substituted QACs or derivatives thereof, complexes of the foregoing types of non-benzyl substituted QACs are contemplated such as PEG-8 Dimethicone Linoeamidopropyl PG-Dimodium (e.g., a phospholipid and a silicone). The foregoing examples of non-benzyl substituted QACs are commercially available, such as those sold under the trade name Cola® (Colonial Chemical). It should also be understood that other non-benzyl substituted QACs, including those having counterions other than chloride, may be used as the release agent.

The release agent may further include an amine amphoteric surfactant which has a nitrogen atom and simultaneously has hermaphroditic ions able to form a cation or an anion. An amine amphoteric surfactant may have a weak nitrogen atom, such as secondary and tertiary amine groups which may only acquire a positive charge on protonation, and/or may have a strong nitrogen atom such as a betaine group with a positively charged cationic functional group that bears no hydrogen atom and a negatively charged functional group (e.g., a carboxylate group that may not be adjacent to the cationic site). The amine amphoteric surfactant may be selected from fatty aminopropionates, characterized with the general formula R—NH—$(CH_2)_2$—COONa, fatty iminodipropionates, characterized the general formula R—N—$((CH_2)_2$—COONa$)_2$, alkyl betaines such as alkyl dimethyl betaines characterized with the general formula R—N—$(CH_3)_2$—$CH_2$—COO, alkyl amidopropyldimethylbetaines, characterized with the general formula R—CO—NH—$(CH_2)_3$—N—$(CH_3)_2$—$CH_2$—COO, imidazoline derived amphoterics, alkyl poly amino carboxylates characterized by four or more nitrogen atoms and four or more carboxylic acid groups, alone or any combinations thereof.

Preferably, the amine amphoteric surfactant is selected from Disodium Cocoamphodiacetate, Cocamidopropyl Hydroxysultaine, Disodium Lauroamphodiacetate, Lauryl Hydroxysultane, Sodium Bis-Hydrocyethylglycinate Coco-Glucosides Crosspolymer, Sodium Cocoamphoacetate, Sodium Cocoamphopropionate, Sodium Lauroamphoacetate, Sodum Stearoamphoacetate, Cetyl Betaine, Cocamidopropyl Betaine, Cocamidopropyl Betaine, Coco Betaine, Lauramidopropyl Betaine, Lauryl Betaine, Polyethylene Glycol PEG-8 PG-Coco-Glucoside Dimethicone, alone or any combination thereof. The foregoing examples of surfactants are commercially available, such as those sold under the trade name Cola®.

The release agent may be present in an amount of about 0.1 wt. % to about 1.5 wt. %, based on the total weight of the germicidal composition. The release agent may, for example, be present in an amount of 0.08 wt. %, 0.5 wt. %, 1.0 wt. %, 1.2 wt. %, 1.8 wt. %, including every number and/or fraction therebetween, based on the total weight of the germicidal composition. Moreover, the ratio of the release agent to the biocide may be about 0.5:1 to about 3:1. The ratio may be, for example, 0.4, 1.0, 2.0, 3.6 of the release agent, including every number and/or fraction therebetween, to 0.8, 1.2 of the biocide, including every number and/or fraction therebetween. In one example, the germicidal composition may include Dihydroxypropyl PEG-5 Linoleammonium Chloride present in an amount of about 0.1 wt. % to about 1.0 wt. %, Behentrimonium Chloride present in an amount of about 0.1 wt. % to about 1.0 wt. %, or a combination of Dihydroxypropyl PEG-5 Linoleammonium Chloride and Behentrimonium Chloride present in a total amount of about of about 0.1 wt. % to about 1.0 wt. %, based on the total weight of the germicidal composition. In a further example, the germicidal composition may include PEG-8 Dimethicone Linoeamidopropyl PG-Dimodium alone, present in a total amount of about of about 0.1 wt. % to about 1.0 wt. %, or in combination with an amine amphoteric surfactant and/or one or more other non-benzyl substituted QACs. In a further example, the germicidal composition may include Disodium Cocoamphodiacetate present in an amount of about 0.1 wt. % to about 1.0 wt. %, Cocamidopropyl PG-Dimonium Chloride Phosphate present in an amount of about 0.1 wt. % to about 1.0 wt. %, or a combination of Disodium Cocoamphodiacetate and Cocamidopropyl PG-Dimonium Chloride Phosphate present in a total amount of about of about 0.1 wt. % to about 1.0 wt. %, based on the total weight of the germicidal composition.

Other Ingredients

The germicidal composition may include other ingredients such as a solvent, a preservative, a preservative booster, an emollient, a pH adjuster, a fragrance, a chelating agent, an extract, a cleanser, a foaming agent, an antioxidant, an ultra-violet (UV) absorber, a dye, alone or any combination thereof. The other ingredients may be present in an amount of about 98.5 wt. % to about 99.9 wt. %, based on the total weight of the germicidal composition. For example, water (e.g., deionized, potable, etc.) may be present in an amount of at least 85 wt. % and alcohol may be present in an amount up to 14.9 wt. %, based on the total weight of the germicidal composition. Alcohol may also be present in an amount greater than 15.0 wt. %, such as 15.1 wt. %, 25 wt. %, 50 wt. %, 75 wt. %, 99.9 wt. %, and every number and/or fraction therebetween, based on the total weight of the germicidal composition.

Solvents are substances that dissolve a solute (a chemically distinct liquid, solid or gas) resulting in a solution. Preferably, the solvent is selected from inorganic solvents such as water and oxygenated solvents such as alcohol (e.g., ethanol, propanol, etc.), although any volatile or non-volatile solvent may be present. A preservative system may include a preservative, which is a substance used to prevent the growth of harmful microorganisms, alone or together with a preservative booster, which is a substance used to improve the effectiveness of the preservative and/or reduce an amount needed to preserve a formulation. Preferably, preservative systems include phenoxyethanol, potassium sorbate, caprylyl glycol, chlorphenesin, and/or parabens (e.g., methylparaben, ethylparaben, propylparaben, etc.), although any preservative and/or booster may be present. Emollients are substances used to soften or smooth skin. Preferably, the emollient is selected from a silicone polymer such as PEG-8 Dimethicone although any emollient silicone polymer and/or other emollient may be present, such as e.g., plant oils, mineral oil, shea butter, cocoa butter, petrolatum, fatty acids (animal oils, including emu, mink, lanolin, etc.), triglycerides, benzoates, myristates, palmitates, stearates, etc. pH adjusters are substances used to adjust the pH of a finished product such as the germicidal composition. Preferably, the pH adjuster is selected from an organic acid such as citric acid although any other organic acid and/or other pH adjuster may be present, such as e.g., a hydroxide (e.g., sodium, calcium, magnesium, potassium, etc.).

Chelating agents are substances used to bind metal ions or metallic compounds, preventing them from adhering to a surface such as skin. Preferably, the chelating agent is selected from an aminopolycarboxylic acid such as Disodium Ethylenediaminetetraacetate (EDTA), although any chelating agent may be present, such as e.g., tetrahydroxypropyl ethylenediamine. Cleansers are substances used to remove undesirable debris (e.g., dirt, dust, clutter, etc.), smells, and oils/fats (degreasers) from surfaces. Preferably, the cleanser is selected from PEG derivatives of lanolin such as PEG-60 Lanolin, an amine amphoteric surfactant such as Sodium Capryloamphopropionate, alone or any combination thereof, although any other cleanser may be present. Foaming agents are substances used to facilitate the formation of a foam. Preferably, the foaming agent is a surfactant including, but not limited to, an anionic surfactant selected from Sodium Laureth Sulfate, Sodium Lauryl Sulfate, alone or any combination thereof, although any other foaming agent may be present. Extracts are substances used for a variety of purposes such as antioxidant and conditioning purposes. Preferably, the extract is selected from fruit extract, flower extract, plant extract (e.g., Aloe Barbadensis Leaf Juice), alone or any combination thereof, although any other extract may be present. Fragrances are substances that give a distinct scent and may be derived from petroleum or natural raw materials. In addition to scent ingredients, other ingredients may include UV-absorbers, dyes, pigments, and so on, such as e.g., metal oxides, chemical sunscreen agents, physical sunscreen agents, mineral-based colorants, etc.

Sterilization Products

Sterilization products (e.g., mops, wipes, pads, etc.) may be formed from synthetic, natural, and/or biodegradable fabrics. Traditional fabrics may, for example, be manufactured by weaving together fibers of silk, cotton, polyester, wool, and similar materials to form an interlocking matrix of loops. Nonwoven fabrics may, for example, be manufactured by pressing a single sheet of material from a mass of separate fibers. Fibers, such as cotton and rayon, may be used in this process as well as plastic resins such as polyester, polyethylene, and polypropylene. Examples of traditional nonwoven fabrics include meltblown webs, spunbond webs, carded webs, wetlaid webs, airlaid webs, alone or any combination thereof.

Meltblown webs may be formed when a molten thermoplastic material is extruded through a plurality of capillaries as molten fibers into converging high velocity air streams that attenuate the fibers of molten thermoplastic material and are carried by the air stream for deposition on a collecting surface to form a web of randomly dispersed meltblown fibers. Spunbond webs may be formed by extruding a molten thermoplastic material from a plurality of capillaries of a spinnerette with the diameter of the extruded fibers then being rapidly reduced by spunbonding processes. Carded webs may be formed when staple fibers are sent through a combing or carding unit, which separates or breaks apart and aligns the staple fibers in the machine direction to form a generally machine direction-oriented fibrous nonwoven web which may then web be bonded. Wetlaid webs may be formed when fibers are made into liquid slurries with water and other chemicals, and the resultant paste is pressed into flat sheets by rollers, dried to form rolls of fabric, processed, slit into narrow widths, and perforated into individual sheets. Airlaid webs may be formed when bundles of fibers are separated, entrained in an air supply, deposited onto a forming surface, and bonded.

Meanwhile, the germicidal solution may be prepared in large batch tanks for scale up. The tank may be charged with the first ingredient (e.g., water) and optionally heated during manufacturing to facilitate blending of powders that must be dissolved or other solids that must be melted. Preferably, a relatively cold process may be used that requires less energy (no heating during batching). The other ingredients of the germicidal solution may then be added sequentially and mixed until homogenous. Notably, germicidal solutions are stable in a wide temperature range (e.g., about 4° C. to about 50° C.). In one embodiment, a wipe is formed when an airlaid web (e.g., wood pulp) and a carded web (e.g., rayon, polyester, etc.) are combined to form a fibrous substrate that can be impregnated with the germicidal composition, wherein the wipe is at least partly anionic to provide electrostatic binding sites.

Wipes, for example, may be fed from storage rolls onto coating machinery where the germicidal composition is applied by running the wipe through a trough of the germicidal composition, spraying the wipe with the germicidal composition from a series of nozzles, pouring the germicidal composition onto the wipe, etc. For example, a roll of wipes may be placed into a container (e.g., a plastic container, etc.) and the germicidal composition may be injected into the container and onto the roll of wipes. Wipes (e.g., individual towelettes) may also be placed in a sealed foil pouch container by feeding sheets of laminated foil into automated equipment that folds them into a small pouch, heating seals on three sides to form an open envelope, feeding the wipes into the pouch, and injecting the germicidal composition onto the wipe (e.g., via a conduit through a stuffing bar that injects the germicidal composition). Alternatively, rolls of fabric may be cut lengthwise, saturated with the germicidal composition, cut into desired sized pieces, and the resulting saturated wipe surrounded by foil. A hinged cover may then be added to the plastic container and closed, or one or more heat seals may seal the foil to form an air-tight pouch (e.g., a final seal for an open envelope, heat sealing on three-sides around the saturated wipe, etc.). Preferred containers are those known to package wipes commercially available under the trademark Wet Ones® (Edgewell Personal Care Brands, LLC) although any dispenser, such as a reusable pull wipe dispenser, may be used to package wipes and any dispenser, such as a bottle, may independently be used to package the germicidal composition. Thus, sterilization product ingredients may be mixed and/or packaged together, or separately and mixed when needed.

Additionally, an amount of germicidal composition to be deployed in and/or from a sterilization product may be readily determined for a given substrate by modulating one or more of the biocide and/or the release agent, such as by varying an amount of both at the same time or maintaining the amount of one of the biocide or the release agent substantially constant while varying the amount of the other of the biocide or the release agent, and evaluating expressed fluid from the given substrate to determine the levels of recovered biocide. Thus, a pre-determined efficacy may be provided based on a pre-determined use level of the germicidal composition, the biocide, and/or the release agent.

While wipes are further described below, germicidal compositions may be utilized in any sterilization product, such as e.g., mops, pads, sponges, etc. Preferably, anionic substrates are used that include a surface at least partly having an anionic charge (e.g., via a coating, via an atom or chemical group that provides an anionic charge, etc.). For example, a cellulosic sponge functionalized with anionic chemical groups may be mixed with a germicidal composition to provide a cellulosic sponge impregnated with the germicidal composition. Additionally, a sterilization product may be a non-foaming product. For example, an anionic substrate (e.g., a nonwoven wipe) may be in contact and/or impregnated with a germicidal solution (e.g., in a container) to provide a non-foaming sterilization product (e.g., non-foaming wet wipe). Thus, some embodiments of sterilization products may not disfavor certain ingredients (e.g., surfactants, etc.) and/or may not require features that increase complexity or cost (e.g., foaming agents, dispensers with actuators for sprays or foams, oils, etc.) while providing a release agent in an effective amount to enable efficient loading of biocide and effective recovery of the biocide from a substrate for sterilization.

Examples

All equipment was cleaned and sanitized before batching. Appropriately sized beakers and propeller blades were selected based on final test volumes. All ingredients listed in Tables 1 and 2 were added while mixing with the propeller blade at about 200 revolutions per minute (rpm). After the fragrance was added, mixing continued until the solution was uniform. Citric acid was added while mixing and pH was verified to an acidic range of about 4.5 to about 5.0.

TABLE 1

| Component (INCI) | Function | wt. % |
|---|---|---|
| Main Ingredients | | |
| Benzalkonium Chloride (and) Ethanol (and) Water | Biocide | 0.01-0.5 |
| PEG-8 Dimethicone Linoeamidopropyl PG-Dimodium, Silicone Quaternium-20 (and) Polypropolyene Glycol, Quaternary Polydimethylsiloxane, Dihydroxypropyl PEG-5 Linoleammonium Chloride, Cocamidopropyl PG-Dimonium Chloride Phosphate, Dihydroxypropyl PEG-5 Linoleammonium Chloride and Behentrimonium Chloride, Cocamidopropyl PG-Dimonium Chloride | Release Agent | 0.1-1.0 |

TABLE 1-continued

| Component (INCI) | Function | wt. % |
| --- | --- | --- |
| Phosphate and Disodium Cocoamphodiacetate, and/or Behentrimonium Chloride | | |
| Other Ingredients | | |
| Potassium Sorbate, Caprylyl Glycol, Disodium EDTA (and) Water, Aloe Barbadensis Leaf Juice (and) Water, PEG-8 Dimethicone, Fragrance, and/or Citric Acid | Preservative System, Chelating Agent, Extract, Emollient, Scent, pH Adjuster | 0.01-3.0 |
| Water, Ethanol (and) Water | Solvents | Q.S. to 100 |

TABLE 2

| Component (INCI) | Function | wt. % |
| --- | --- | --- |
| Main Ingredients | | |
| Benzethonium Chloride | Biocide | 0.01-0.5 |
| PEG-8 Dimethicone Linoeamidopropyl PG-Dimodium, Silicone Quaternium-20 (and) Polypropolyene Glycol, Quaternary Polydimethylsiloxane, Dihydroxypropyl PEG-5 Linoleammonium Chloride, Cocamidopropyl PG-Dimonium Chloride Phosphate, Dihydroxypropyl PEG-5 Linoleammonium Chloride and Behentrimonium Chloride, Cocamidopropyl PG-Dimonium Chloride Phosphate and Disodium Cocoamphodiacetate, and/or Behentrimonium Chloride | Release Agent | 0.1-1.0 |
| Other Ingredients | | |
| Potassium Sorbate, Caprylyl Glycol, Phenoxyethanol (and) Methylparaben (and) Ethylparaben (and) Propylparaben, Sodium Capryloamphopropionate, PEG-60 Lanolin (and) Water, Disodium EDTA (and) Water, Aloe Barbadensis Leaf Juice (and) Water, PEG-8 Dimethicone, Fragrance, and/or Citric Acid | Preservative System, Cleansing system, Chelating agent, Extract, Emollient, Scent, pH Adjuster | 0.001-3.0 |
| Water, Ethanol (and) Water | Solvents | Q.S. to 100 |

Referring to FIG. 1, examples 1-10 were evaluated for the effect of certain release agents on Benzalkonium Chloride recovery from nonwoven wipes. Concentrations within the listed ranges of all ingredients in Table 1 were the same among examples 1-10, except that solvent was adjusted to account for a lack of release agent in example 1. The type of release agent in the formulations varied among examples 2-10. Additionally, examples 2-7 and 10 had one release agent in the formulations and examples 8-9 had two release agents in the formulations. The two release agents in examples 8-9 were present in equal parts and totaled the concentration of any single release agent in examples 2-7 or 10 so that the total concentration of release agent was the same in the formulations of examples 2-10.

Expressed fluid from a wipe was recovered by manual expression of germicidal composition from saturated wipes into an appropriately sized beaker. Following the manual expression, samples were mixed and a portion of each sample was transferred to an appropriately sized sample. The quantitative determination of biocide in antibacterial formulations was implemented using high performance liquid chromatography (HPLC). At least five consecutive injections, into the HPLC, of the filtered standard solution were used for system suitability and calibration. The samples were prepared in duplicate and each filtered solution was injected at least once into the HPLC.

Example 1 had no release agent and provided a 33.0% recovery of Benzalkonium Chloride in expressed fluid from wipes. Thus, 33.0% of Benzalkonium Chloride in the germicidal composition that was poured onto the fibrous substrate to create the wipe (e.g., bulk solution) was recovered in expressed fluid from the wipe. Example 2 had Hydroxypropyl Bis-Hydroxyethyldimonium Chloride (not shown in Table 1) as a release agent and provided no appreciable effect on Benzalkonium Chloride recovery (33.2%). The QAC humectant, therefore, did not provide a suitable synergistic effect as a release agent. The recovery of Benzalkonium Chloride in expressed fluid from wipes, however, was unexpectedly modulated when the release agent was selected from a non-benzyl substituted quaternary ammonium halide cationic surfactant, a non-benzyl substituted quaternary ammonium cationic silicone, and/or a non-benzyl substituted quaternary ammonium cationic phospholipid.

FIG. 1 shows the unexpected synergy of Benzalkonium Chloride with certain release agents listed in Table 1 on biocide recovery (and biocide efficacy) from wipes as follows: example 3, PEG-8 Dimethicone Linoeamidopropyl PG-Dimodium (46.8%); example 4, Silicone Quaternium-20 (and) Polypropolyene Glycol (52.4%); example 5, Quaternary Polydimethylsiloxane (52.8%); example 6, Dihydroxypropyl PEG-5 Linoleammonium Chloride (56.8%); example 7, Cocamidopropyl PG-Dimonium Chloride Phosphate (57.6%); example 8, Dihydroxypropyl PEG-5 Linoleammonium Chloride and Behentrimonium Chloride (59.2%); example 9, Cocamidopropyl PG-Dimonium Chloride Phosphate and Disodium Cocoamphodiacetate (60.8%); example 10, Behentrimonium Chloride (69.4%).

Table 3 shows that the recovery of Benzalkonium Chloride in expressed fluid from wipes can be modulated with varying levels of biocide in the germicidal composition at constant levels of release agent. Examples 10-11 in Table 3 were similar to example 6 and examples 12-14 in Table 3 were similar to example 9, except that the concentration of Benzalkonium Chloride in the formulations varied within the ranges listed in Table 1 for examples 10-14 while solvent was adjusted to account for changing amounts of biocide. As shown in Table 3, efficacy of the biocide can be tailored at constant levels of release agent by altering the concentration of the biocide in the germicidal compositions (e.g., bulk solution).

TABLE 3

| Example | Benzalkonium Chloride wt. % | Recovery % | Irritation |
|---|---|---|---|
| 10 | 0.20 | 56.0 | Negligible, no significant irritation |
| 11 | 0.35 | 56.5 | Negligible, no significant irritation |
| 12 | 0.18 | 57.7 | Negligible, no significant irritation |
| 13 | 0.37 | 62.7 | Negligible, no significant irritation |
| 14 | 0.52 | 70.6 | Negligible, no significant irritation |

The safety for the formulations of examples 10-14 were also evaluated using a cumulative irritancy test that implemented a repeated insult patch test on human participants to identify irritancy potential of substances or formulations. Sodium lauryl sulfate (SLS) was used as the positive control and Webril patch was used as the negative control. Irritation was determined as a function of Cumulative Irritation Index/Irritancy Potential. As shown in Table 3, irritation is negligible or not significant despite increasing levels of the Benzalkonium Chloride in examples 10-14.

Unexpectedly, the recovery of Benzalkonium Chloride in expressed fluid from wipes can also be modulated with varying levels of release agent in the germicidal composition at constant levels of biocide. Examples 15-16 in Table 4 were similar to example 6 except that the concentration of Benzalkonium Chloride in the formulations was first lowered (but still within the ranges listed in Table 1) for examples 15-16 and then the amount of release agent in the formulations was increased from 0.5% in example 15 to 1.5% in example 16 while solvent was adjusted to account for changing amounts of release agent. As shown in Table 4, the recovery of Benzalkonium Chloride in expressed fluid from wipes surprisingly increased from 56.0% to 72.8% with increasing levels of release agent. Notably, this result was also counter to any conventional expectation that increasing amounts of release agent would reduce the amount of biocide in expressed fluid based on changes in relative concentrations. Thus, the efficacy of the biocide can be tailored at constant levels of biocide by altering the concentration at least of the release agent in the germicidal compositions (e.g., bulk solution). The modulation at least of the release agent, and/or associated amounts, may also be a useful mechanism to provide effective amounts of biocide from sterilization products without using unnecessary amounts of biocide and/or while meeting any applicable regulatory needs.

TABLE 4

| Example | Release Agent wt. % | Biocide Recovery % |
|---|---|---|
| 15 | 0.5 | 56.0 |
| 16 | 1.5 | 72.8 |

Examples 17-25 were evaluated for the effect of certain release agents on Benzethonium Chloride recovery from nonwoven wipes. Concentrations within the ranges of all ingredients in Table 2 were the same among examples 17-25 shown in Table 5, except that the concentration of certain release agents in the formulations listed in Table 2 varied within the listed ranges and solvent was adjusted in the formulations to account for the changing amounts of release agent. The concentration of Benzethonium Chloride in the formulations within the ranges listed in Table 2 was the same in examples 17-25 and comparative example 26. Comparative example 26 had a similar formula to nonwoven wipes commercially available under the trademark Wet Ones®, which lack release agents.

TABLE 5

| Release Agent | Example | Release Agent wt. % | Benzethonium Chloride wt. % | Recovery % |
|---|---|---|---|---|
| Dihydroxypropyl PEG-5 | 17 | 0.25 | 0.3 | 48.33 |
|  | 18 | 0.40 | 0.3 | 52.33 |
| Linoleammonium Chloride | 19* | 0.50 | 0.3 | 53.84 |
|  | 20 | 0.60 | 0.3 | 56.67 |
| Cetrimonium Chloride | 21 | 0.25 | 0.3 | 51.33 |
|  | 22+ | 0.40 | 0.3 | 55.67 |
|  | 23 | 0.50 | 0.3 | 56.11 |
| Behentrimonium Chloride | 24 | 0.50 | 0.3 | 74.33 |
| Cocamidopropyl PG-Dimonium Chloride Phosphate | 25 | 0.50 | 0.3 | 54.00 |
| None | 26 | 0.0 | 0.3 | 42.83 |

*indicates that the formula was tested in duplicate and the recovery rate was reported as an average.
+indicates that the formula was tested in triplicate and the recovery rate was reported as an average.

As shown in Table 5, the release agents in the formulations of examples 17-25 surprisingly increased the recovery of Benzethonium Chloride compared to example 26, which had the same concentration of biocide but tacked any release agent. Unexpectedly, the recovery of Benzethonium Chloride in expressed fluid from wipes was also modulated with varying levels of release agent in the germicidal composition at constant levels of biocide. Thus, the efficacy of the biocide can be tailored at constant levels of biocide by altering the concentration of the release agent in the germicidal compositions (e.g., bulk solution).

Figure 2A:
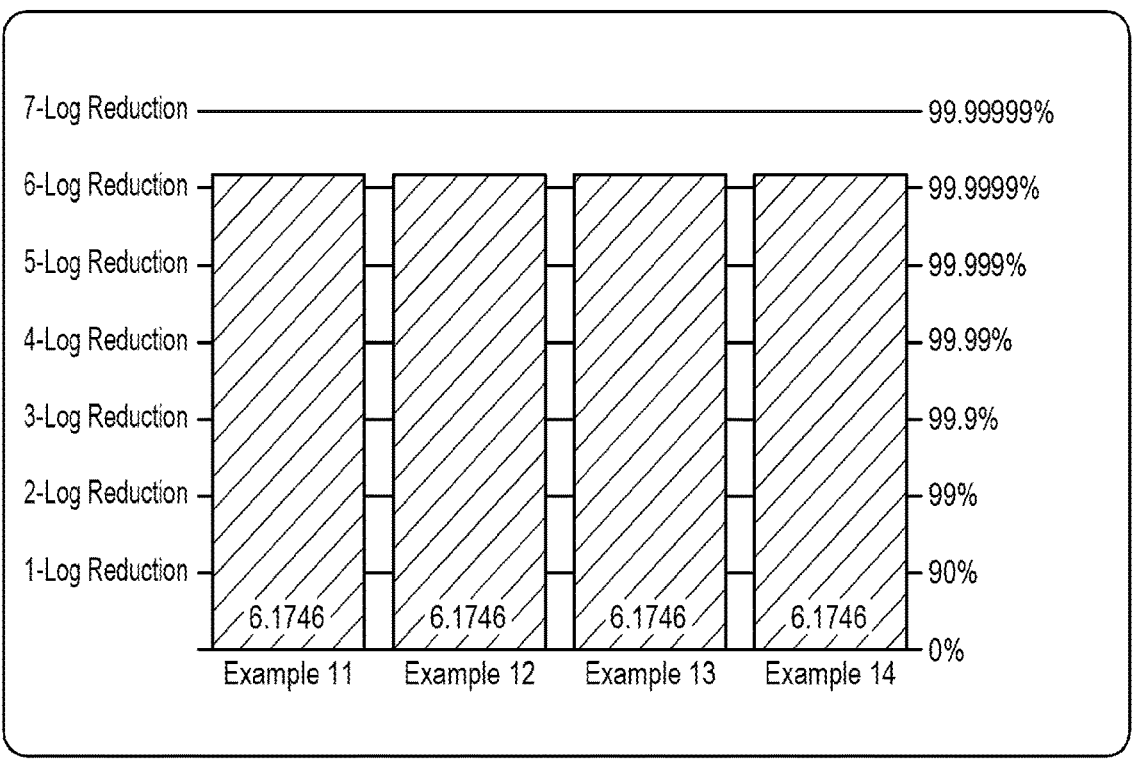
FIGS. 2A-2B are graphs showing the in vitro time kill evaluations of various germicidal compositions having Benzalkonium Chloride on gram-positive bacteria and gram-negative bacteria, respectively, according to embodiments.
Figure 2B:
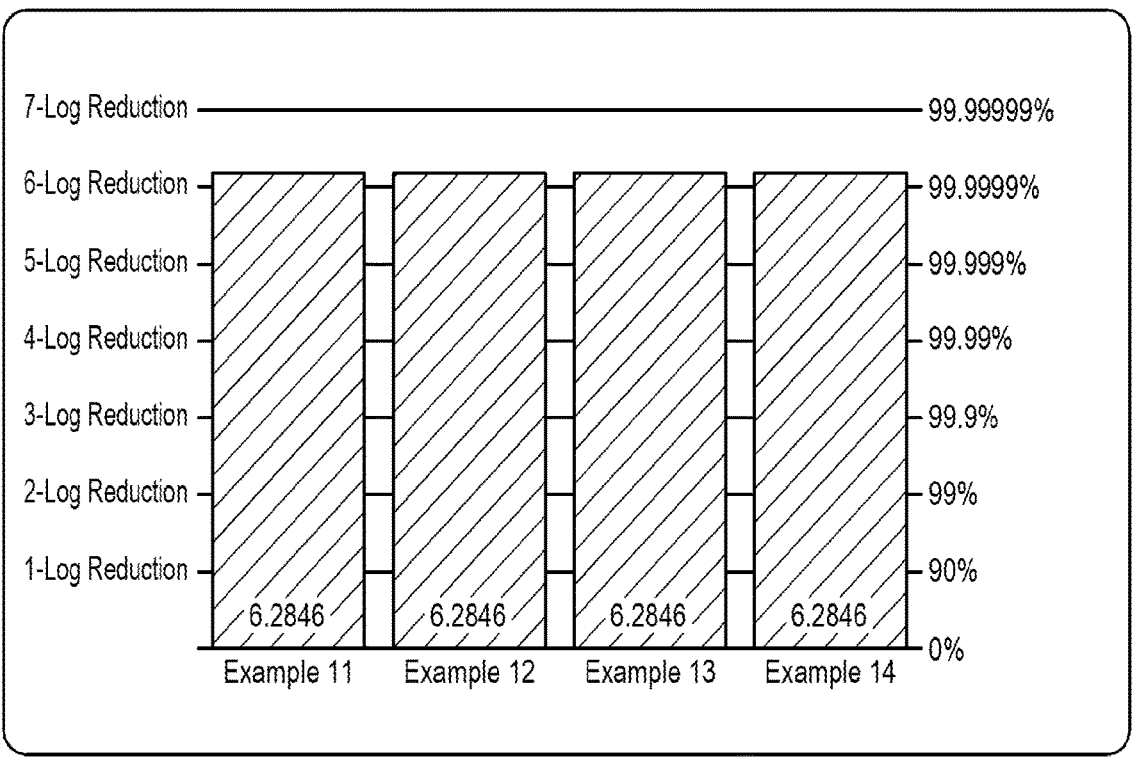

Turning now to FIGS. 2A-2B, the in vitro kill efficacy of germicidal solutions including Benzalkonium Chloride were evaluated using a test based on the ASTM Standard Test Method for Assessment of Antimicrobial Activity for Water Miscible Compounds Using a Time-Kill Procedure (ASTM E2783-11(2016)). The test product (antibacterial solution expressed from wipes) was evaluated against positive control (ethanol) and placebo (saline solution). During the test, the product, the positive control, and the placebo were challenged with suspensions of thirty-one bacterial species. The percent and $\log_{10}$ reduction from the initial population of each challenge species was determined following exposure to each test material.

As shown in FIG. 2A, examples 11-14 provided a greater than 6-log kill rate against *Staphylococcus Aureus* (ATCC #6538, ATCC #29213) after thirty (30) seconds. As shown in FIG. 2B, examples 11-14 provided a greater than 6-log kill rate against *Escherichia Coli* (ATCC #11775, ATCC #25922) after 30 seconds. Thus, embodiments may provide a greater than 99.9999% reduction. Embodiments were further evaluated and found to be effective against: Human Coronavirus (alphacoronavirus), *Bacteroides fragilis* (ATCC #25285), *Campylobacter jejuni* (ATCC #33291 and ATCC #49943), *Enterobacter cloacae* (ATCC #13047), *Enterococcus faecalis* (ATCC #19433, ATCC #29212), *Haemophilus influenzae* (ATCC #19418), *Klebsiella pneumoniae* (ATCC #13883), *Pseudomonas aeruginosa* (ATCC #15442, ATCC #27853), *Salmonella Enteritidis* (ATCC #13076), *Salmonella enterica Typhimurium* (ATCC #14028), *Serralia marcescens* (ATCC #8100), *Shigella sonnei* (ATCC #9290, ATCC #25931), *Staphylococcus aureus* MRSA (ATCC #33591, ATCC #33592), *Streptococcus pneumoniae* (ATCC #6303, ATCC #49619), *Streptococcus pyogenes* (ATCC #14289, ATCC #19615), *Klebsiella pneumoniae* (ATCC #27736), *Serratia marcescens* (ATCC #14756), *Burkholderia cepacio* (ATCC #25416, ATCC #25608), *Listeria monocytogenes* (ATCC #7644, ATCC #19115).

ADDITIONAL NOTES AND EXAMPLES

Additional Example 1 includes germicidal composition comprising a biocide selected from the group consisting of a benzyl substituted quaternary ammonium compound (QAC) and a release agent selected from the group consisting of a non-benzyl substituted quaternary ammonium cationic surfactant, a non-benzyl substituted quaternary ammonium cationic silicone, a non-benzyl substituted quaternary ammonium cationic phospholipid, or any combination thereof.

Additional Example 2 includes the germicidal composition of Additional Example 1, wherein the ratio of the release agent to the biocide is about 0.5:1 to about 3:1.

Additional Example 3 includes the germicidal composition of any of Additional Examples 1-2, wherein the biocide is present in an amount of about 0.01 wt. % to about 0.5 wt. %, based on the total weight of the germicidal composition.

Additional Example 4 includes the germicidal composition of any of Additional Examples 1-3, wherein the release agent is present in an amount of about 0.1 wt. % to about 1.0 wt. %, based on the total weight of the germicidal composition.

Additional Example 5 includes the germicidal composition of any of Additional Examples 1-4, wherein the release agent is present in an amount of about 0.2 wt. % to about 0.6 wt. % and the biocide is present in an amount of about 0.1 wt. % to about 0.4 wt. %, based on the total weight of the germicidal composition.

Additional Example 6 includes the germicidal composition of any of Additional Examples 1-5, wherein the benzyl substituted QAC is selected from the group consisting of alkyl dimethyl benzyl ammonium chloride, diisobutylphenoxyethyoxyethyl dimethyl benzyl ammonium chloride, or any combination thereof.

Additional Example 7 includes the germicidal composition of any of Additional Examples 1-6, wherein the benzyl substituted QAC includes $C_8$-$C_{18}$ alkyl dimethyl benzyl ammonium chloride.

Additional Example 8 includes the germicidal composition of any of Additional Examples 1-7, wherein the non-benzyl substituted QAC includes Dihydroxypropyl PEG-5 Linoleammonium Chloride.

Additional Example 9 includes the germicidal composition of any of Additional Examples 1-8, wherein the release agent further includes an amine amphoteric surfactant.

Additional Example 10 includes the germicidal composition of any of Additional Examples 1-9, further including a solvent, a preservative, an emollient, a preservative booster, a pH adjuster, a fragrance, a chelating agent, an extract, or any combination thereof.

Additional Example 11 includes a wipe comprising a fibrous substrate and at least a biocide of a germicidal composition impregnated in the fibrous substrate, wherein the germicidal composition includes a biocide selected from the group consisting of a benzyl substituted quaternary ammonium compound (QAC) and a release agent selected from the group consisting of a non-benzyl substituted quaternary ammonium cationic surfactant, a non-benzyl substituted quaternary ammonium cationic silicone, a non-benzyl substituted quaternary ammonium cationic phospholipid, or any combination thereof.

Additional Example 12 includes the wipe of Additional Example 11, wherein an initial ratio of the release agent to the biocide is about 0.5:1 to about 3:1.

Additional Example 13 includes the wipe of any of Additional Examples 11-12, wherein the recovery of the biocide in expressed fluid from the fibrous substrate is to be modulated as the concentration of the release agent in the germicidal composition is modulated.

Additional Example 14 includes the wipe of any of Additional Examples 11-13, wherein the benzyl substituted QAC is selected from the group consisting of alkyl dimethyl benzyl ammonium chloride, diisobutylphenoxyethyoxyethyl dimethyl benzyl ammonium chloride, or any combination thereof.

Additional Example 15 includes the wipe of any of Additional Examples 11-14, wherein the benzyl substituted QAC includes $C_8$-$C_{18}$ alkyl dimethyl benzyl ammonium chloride.

Additional Example 16 includes the wipe of any of Additional Examples 11-15, wherein the non-benzyl substituted QAC includes Dihydroxypropyl PEG-5 Linoleammonium Chloride.

Additional Example 17 includes the wipe of any of Additional Examples 11-16, wherein the release agent further includes an amine amphoteric surfactant.

Additional Example 18 includes the wipe of any of Additional Examples 11-17, further including a solvent, a preservative, an emollient, a preservative booster, a pH adjuster, a fragrance, a chelating agent, an extract, or any combination thereof.

Additional Example 19 includes the wipe of any of Additional Examples 11-18, further including a container within which the wipe is located.

Additional Example 20 includes a method to sterilize a surface comprising contacting the surface with the wipe of any one of Additional Examples 11-19.

Additional Example 21 includes a non-foaming sterilization product comprising an anionic substrate and a germicidal composition in contact with the anionic substrate, wherein the germicidal composition includes a benzyl substituted quaternary ammonium compound (QAC) including alkyl dimethyl benzyl ammonium chloride, diisobutylphenoxyethyoxyethyl dimethyl benzyl ammonium chloride, or any combination thereof, a release agent including dihydroxypropyl PEG-5 linoleammonium chloride present in an amount of about 0.2 wt. % to about 0.75 wt. %, based on the total weight of the germicidal composition, and a solvent.

Additional Example 22 includes the sterilization product of Additional Example 21, wherein the ratio of the release agent to the biocide is about 0.5:1 to about 3:1.

Additional Example 23 includes the sterilization product of any of Additional Examples 21-22, wherein the biocide is present in an amount of about 0.01 wt. % to about 0.5 wt. %, based on the total weight of the germicidal composition.

Additional Example 24 includes the sterilization product of any of Additional Examples 21-23, wherein a total amount of release agents in the germicidal composition is about 0.2 wt. % to about 1.0 wt. %, based on the total weight of the germicidal composition, and the biocide is present in an amount of about 0.1 wt. % to about 0.4 wt. %, based on the total weight of the germicidal composition.

Additional Example 25 includes the sterilization product of any of Additional Examples 21-24, wherein the benzyl substituted QAC includes $C_8$-$C_{18}$ alkyl dimethyl benzyl ammonium chloride.

Additional Example 26 includes the sterilization product of any of Additional Examples 21-25, wherein the release agent further includes behentrimonium chloride, centrimonium chloride, dicetyldimonium chloride, bishydroxyethyl dihydroxypropyl stearammonium chloride, or any combination thereof.

Additional Example 27 includes the sterilization product of any of Additional Examples 21-26, wherein the germicidal composition further includes an amine amphoteric surfactant, a solvent, a preservative, an emollient, a preservative booster, a pH adjuster, a fragrance, a chelating agent, an extract, or any combination thereof.

Additional Example 28 includes the sterilization product of any of Additional Examples 21-27, wherein the anionic substrate comprises a nonwoven wipe.

Additional Example 29 includes the sterilization product of any of Additional Examples 21-28, further including a container within which the sterilization product is located.

Additional Example 30 includes a method to sterilize a surface comprising contacting the surface with the sterilization product of any of Additional Examples 21-29.

Additional Example 31 includes a method of making a sterilization product comprising selecting a substrate, contacting the substrate with a germicidal composition to impregnate the substrate with at least a biocide, wherein the germicidal composition includes a biocide selected from a benzyl substituted quaternary ammonium compound and a release agent selected from a non-benzyl substituted quaternary ammonium cationic surfactant, a non-benzyl substituted quaternary ammonium cationic silicone, a non-benzyl substituted quaternary ammonium cationic phospholipid, or any combination thereof, wherein the sterilization product optionally is non-foaming and/or excludes a foaming agent.

Additional Example 32 includes the method of Additional Example 31, further including selecting a substrate from the group consisting of an anionic substrate, contacting the substrate with the germicidal composition to impregnate the substrate with at least the biocide, wherein the germicidal composition includes a biocide selected from a benzyl substituted quaternary ammonium compound (QAC) including alkyl dimethyl benzyl ammonium chloride, diisobutylphenoxyethyoxyethyl dimethyl benzyl ammonium chloride, or any combination thereof, a release agent including dihydroxypropyl PEG-5 linoleammonium chloride present in an amount of about 0.2 wt. % to about 0.75 wt. %, based on the total weight of the germicidal composition, and a solvent.

Additional Example 33 includes the method of any of Additional Examples 31-32, further including determining a final amount of the germicidal composition in the sterilization product based on the recovery of the biocide in expressed fluid from the substrate determined from an increase in the amount of the release agent to increase the recovery of the biocide in the expressed fluid or a decrease in the amount of the release agent to decrease the recovery of the biocide in the expressed fluid.

Additional Example 34 includes the method of any of Additional Examples 31-33, wherein the substrate comprises a nonwoven wipe.

Additional Example 35 includes the method of any of Additional Examples 31-34, further comprising providing a container within which the sterilization product is located.

Additional Example 36 includes the method of any of Additional Examples 31-35, wherein the container includes one or more of a canister or a pouch.

Additional Example 37 includes the method of any of Additional Examples 31-36, wherein the ratio of the release agent to the biocide is about 0.5:1 to about 3:1.

Additional Example 38 includes the method of any of Additional Examples 31-37, wherein the biocide is present in an amount of about 0.01 wt. % to about 0.5 wt. %, based on the total weight of the germicidal composition.

Additional Example 39 includes the method of any of Additional Examples 31-38, wherein a total amount of release agents in the germicidal composition is about 0.2 wt. % to about 1.0 wt. %, based on the total weight of the germicidal composition and the biocide is present in an amount of about 0.1 wt. % to about 0.4 wt. %, based on the total weight of the germicidal composition.

Additional Example 40 includes the method of any of Additional Examples 31-39, wherein the benzyl substituted QAC includes $C_8$-$C_{18}$ alkyl dimethyl benzyl ammonium chloride.

Additional Example 41 includes the method of any of Additional Examples 31-40, wherein the release agent further includes behentrimonium chloride, centrimonium chloride, dicetyldimonium chloride, bishydroxyethyl dihydroxypropyl stearammonium chloride, or any combination thereof.

Additional Example 42 includes the method of any of Additional Examples 31-41, wherein the germicidal composition further includes an amine amphoteric surfactant, a solvent, a preservative, an emollient, a preservative booster, a pH adjuster, a fragrance, a chelating agent, an extract, or any combination thereof.

While the present disclosure has been particularly described, in conjunction with specific preferred embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present disclosure.

What is claimed is:

1. A non-foaming sterilization product comprising:
   an anionic substrate; and
   a germicidal composition in contact with the anionic substrate, wherein the germicidal composition includes:
   a biocide comprising a benzyl substituted quaternary ammonium compound (QAC) including one or more of alkyl dimethyl benzyl ammonium chloride, diisobutylphenoxyethyoxyethyl dimethyl benzyl ammonium chloride, or any combination thereof;
   a release agent including dihydroxypropyl PEG-5 linoleammonium chloride present in an amount of about 0.2 wt. % to about 0.75 wt. %, based on the total weight of the germicidal composition; and
   a solvent.

2. The sterilization product of claim 1, wherein the ratio of the release agent to the biocide is about 0.5:1 to about 3:1.

3. The sterilization product of claim 1, wherein the biocide is present in an amount of about 0.01 wt. % to about 0.5 wt. %, based on the total weight of the germicidal composition.

4. The sterilization product of claim 1, wherein a total amount of the release agent in the germicidal composition is about 0.2 wt. % to about 1.0 wt. %, based on the total weight of the germicidal composition, and the biocide is present in an amount of about 0.1 wt. % to about 0.4 wt. %, based on the total weight of the germicidal composition.

5. The sterilization product of claim 1, wherein the benzyl substituted QAC includes $C_8$-$C_{18}$ alkyl dimethyl benzyl ammonium chloride.

6. The sterilization product of claim 1, wherein the release agent further includes one or more of behentrimonium chloride, centrimonium chloride, dicetyldimonium chloride, bishydroxyethyl dihydroxypropyl stearammonium chloride, or any combination thereof.

7. The sterilization product of claim 1, wherein the germicidal composition further includes one or more of an amine amphoteric surfactant, a solvent, a preservative, an emollient, a preservative booster, a pH adjuster, a fragrance, a chelating agent, an extract, or any combination thereof.

8. The sterilization product of claim 1, wherein the anionic substrate comprises a nonwoven wipe.

9. A container comprising the sterilization product is located.

10. A method to sterilize a surface comprising contacting the surface with the sterilization product of claim 1.

11. A method of making a non-foaming sterilization product comprising:
selecting a substrate from the group consisting of an anionic substrate;
contacting the substrate with a germicidal composition to impregnate the anionic substrate with at least a biocide, wherein the germicidal composition includes:
a biocide comprising a benzyl substituted quaternary ammonium compound (QAC) as the biocide including one or more of alkyl dimethyl benzyl ammonium chloride, diisobutylphenoxyethyoxyethyl dimethyl benzyl ammonium chloride, or any combination thereof;
a release agent including dihydroxypropyl PEG-5 linoleammonium chloride present in an amount of about 0.2 wt. % to about 0.75 wt. %, based on the total weight of the germicidal composition; and
a solvent.

12. The method of claim 11, wherein the anionic substrate comprises a nonwoven wipe.

13. The method of claim 11, further comprising providing a container within which the sterilization product is located.

14. The method of claim 13, wherein the container includes one or more of a canister or a pouch.

15. The method of claim 11, wherein the ratio of the release agent to the biocide is about 0.5:1 to about 3:1.

16. The method of claim 11, wherein the biocide is present in an amount of about 0.01 wt. % to about 0.5 wt. %, based on the total weight of the germicidal composition.

17. The method of claim 11, wherein a total amount of the release agent in the germicidal composition is about 0.2 wt. % to about 1.0 wt. %, based on the total weight of the germicidal composition and the biocide is present in an amount of about 0.1 wt. % to about 0.4 wt. %, based on the total weight of the germicidal composition.

18. The method of claim 11, wherein the benzyl substituted QAC includes $C_8$-$C_{18}$ alkyl dimethyl benzyl ammonium chloride.

19. The method of claim 11, wherein the release agent further includes one or more of behentrimonium chloride, centrimonium chloride, dicetyldimonium chloride, bishydroxyethyl dihydroxypropyl stearammonium chloride, or any combination thereof.

* * * * *